Sept. 27, 1960 S. W. TARNER 2,954,079
TUBELESS TIRE BEAD SEATING AND INFLATING DEVICE
Filed Jan. 3, 1956
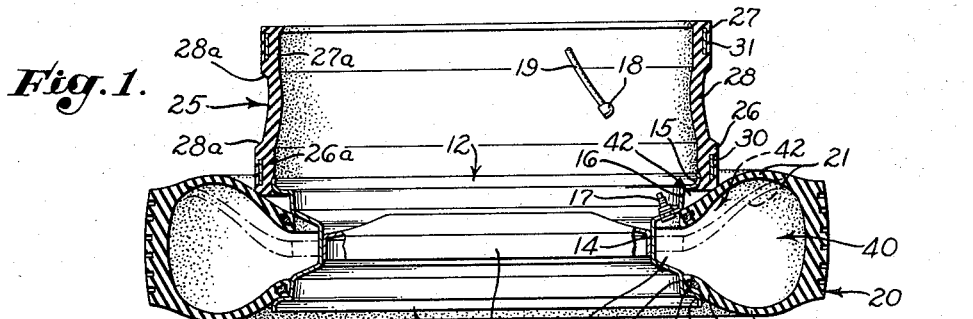
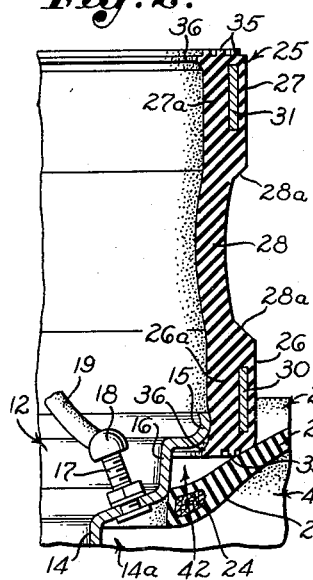
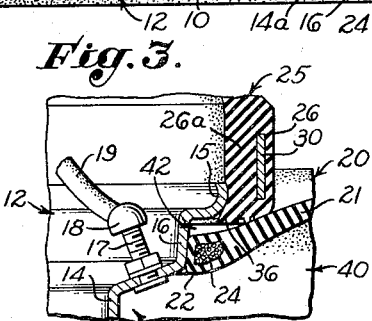
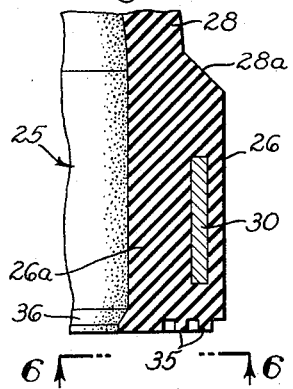
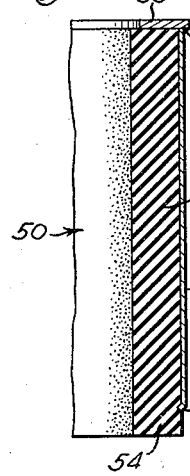
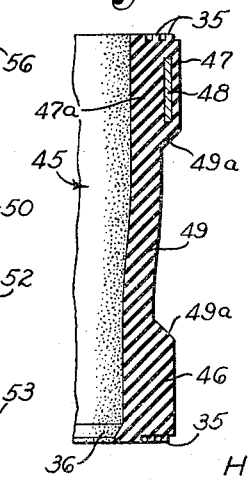
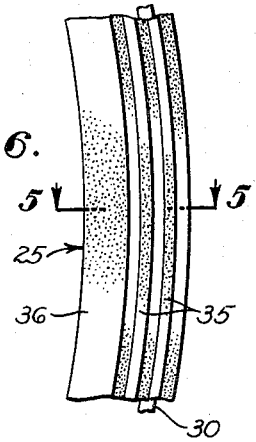
INVENTOR.
SAMUEL W. TARNER
BY HIS ATTORNEYS.
HARRIS, KIECH, FOSTER & HARRIS

United States Patent Office 2,954,079
Patented Sept. 27, 1960

2,954,079

TUBELESS TIRE BEAD SEATING AND INFLATING DEVICE

Samuel W. Tarner, Elsinore, Calif., assignor to Alfred C. Wilson, Corona, Calif.

Filed Jan. 3, 1956, Ser. No. 556,969

5 Claims. (Cl. 157—1.1)

This invention involves means for inflating tubeless tires and properly positioning them upon the tire rims of metallic wheels such as automobile wheels.

The modern tubeless automobile tire, which has become quite common, is required to be mounted upon a conventional so-called drop-center rim carried upon the usual metallic wheel. Since an air-tight seal is required to be produced between flanges of such rim and side and edge portions of the beads of the tire, and since such beads require a snug fit against the flanges of a wheel rim, considerable difficulty is ordinarily experienced in obtaining a sealing positioning of the tire beads on a rim when attempting to inflate the tire on the wheel rim. This is due at least in part to the inability to avoid air leaks and build up sufficient pressure within the tire through the use of a valve which, in the case of tubeless tires, is carried by the respective rims.

It is therefore a principal object of this invention to provide a relatively simple and at the same time a highly efficient inflating device to be used with a tubeless tire and its rim to obtain proper inflation when applying air under pressure to the usual valve on the wheel rim as above indicated.

It is also an object of the invention to provide an inflating device for a tubeless tire which may be easily applied to a tire and a wheel rim upon which it is mounted so that areas of contact between the tire rim, the tire and the inflating device may be sufficiently sealed to retain within the tire adequate pressure to cause the tire beads to seal properly against the usual flanges of of the wheel rim.

A further object of the invention is to provide an inflating device for use with tubeless tires on the indicated wheel rims which will cause retention of air applied under pressure sufficiently to insure snapping of the beads of the tires into operative sealing position on the rim.

Other objects of the invention and various advantages and features of construction of the invention will become apparent to those skilled in the art upon reference to the following specification and the accompanying drawing.

In the drawing:

Fig. 1 is principally a cross section through a tire-inflating device of this invention, a wheel rim and wheel with a tubeless tire positioned thereon, the inflator being shown as so mounted as adequately to seal between the wheel rim and the tire to provide for proper tire inflation and positioning of the tire beads properly against the flanges of the wheel rim;

Fig. 2 is an enlarged sectional detail of the parts seen at the right of Fig. 1;

Fig. 3 is a similarly enlarged fragmentary detail showing the upper tire bead as it is moved into position by reason of accumulating pressure;

Fig. 4 is a similarly fragmentary detail showing the upper tire bead as forced into sealing position;

Fig. 5 is a further enlarged vertical sectional detail through the tool of this invention, the tool being removed from a wheel rim and tire, such section being indicated by the line 5—5 of Fig. 6;

Fig. 6 is a fragmentary plan view of the lower side of the tool of this invention as indicated by the line 6—6 of Fig. 5;

Fig. 7 is a vertical section of a modified form of structure assuming the device to be in the general position of Figs. 1 and 2; and Fig. 8 illustrates a further possible modification.

In the drawing, Fig. 1 illustrates a conventional automobile wheel 10 having the usual rim 12 including a typical drop-center annular portion 14 connecting the conventional opposing flanges 15 through the medium of integral annular shoulders 16, the peripheral portions of the flanges 15 being conventionally rolled or curved as illustrated. The drop-center section 14 carries the usual valve stem 17 which is engageable by a typical fitting 18 of an air hose 19.

Mounted upon the rim 12 of the wheel 10 is a typical tubeless tire 20 having the usual opposite side walls 21 provided at the inner annular edges with conventional beads 22 reinforced with the usual non-stretchable wire cables 24 or the like. The tire 20 will have been installed in the conventional manner by dropping the beads 22 at one side of the tire into the annular channel 14a within the drop center of section 14. The lower bead 22 is readily movable into the seat therefor provided by the annular flange 15 of the rim and the stepped shoulder 16. The difficulty which arises in installing tubeless tires is in raising the upper bead 22 into its annular seat within the upper flange 15 when the parts are in the position illustrated. Maybe this is because the upper bead 22, even if it moves upward from the broken-line position of Fig. 1 to the solid-line position thereof, catches on the annular edge between the drop-center section 14 and the annular shoulder section 16 and cannot be forced up into the seated position of Fig. 4 unless considerable air pressure can be developed within the tire. Commonly there is so much leakage between the corner of the upper bead 22 and the described joint between the parts 14 and 16 that the amount of air under pressure which can be passed by the valve stem 17 cannot build up adequate pressure to snap the upper bead 22 up into sealing position.

It is therefore the purpose of this improvement to control air leakage as air is applied to the valve stem 17 by way of the fitting 18 on the mentioned air hose 19. This is accomplished by the inflating tool of this invention. The inflating tool structure illustrated in Fig. 1 is a cylindrical vulcanized rubber body 25, which is thus in the form of an annulus that conveniently is approximately as wide as the wheel rim 12 or the tire 20, its opposite sides being of somewhat different diameters so as to be invertible to accommodate different ranges of diameters of rims. The annular body 25 shown has lower and upper annular rim-engaging side portions 26 and 27 which are desirably thicker than the median annular portion 28, defined between them by external shoulders 28a, so that they may have embedded therein, as at the time of vulcanization of the rubber body 25, continuous lower and upper annular steel bands or rings 30 and 31 respectively which are non-extensible, that is non-stretchable, and prevent stretching of the outer wall of the respective portions 26 and 27 while also limiting compression of the respective thick annular portions 26a and 27a within the bands 30 and 31 when the device is being used.

The bands 30 and 31, which are of somewhat different diameters to accommodate the mentioned differing rim diameters, are spaced a short distance inward from the respective outer edges of the body 25 so as to be embedded in the rubber body 25. In general, the lower band will lie opposite the upper flange 15, this being the band 30 of Figs. 1, 2 and 3, whereby to insure sufficient air-retention compression of the respective thicker inner annular portion 26a (or 27a) against such flange 15. When the body 25 cools in vulcanization, the unreinforced median portion 28 shrinks somewhat, so that when the upper edge of the respective band 30 (or 31) is forced below the flange 15 (as occurs when the tool and the upper tire side wall 21 are forced down to the broken-line position of Fig. 1) the contraction at the shoulder 28a will tend to increase the friction or "drag" on the rim 15. While advantageous, this feature is not essential.

The thickness of the inner annular portions 26a and 27a is sufficient to permit them to yield, when the tool is forced down over a rim 15, to accommodate variations in rim diameters within a suitable range, for example three-eighths to one-half inch difference in rim diameters for each side of the tool. By having the two side portions 26 and 27 differ in normal diameters, the usual range of automobile rim diameters is accommodated. A common Shore hardness of rubber used of about 50, or between about 40 Shore and about 60 Shore, adequately provides appropriate yield and sealing for ordinary rim diameter variations indicated. Inasmuch as a reasonably good seal is required, not only at the rim flange 15, but also between the lower end of the rubber body 25 and the adjacent side wall 21 of the tire, this is accomplished by the ring of rubber between the band 30 and the contacted tire wall surface. This may be facilitated by annularly grooving the ends of the rubber body 25 at one or two positions to provide two or more integral rubber ribs 35. In addition, it is preferred to form at the inner corner of each end of the body an inwardly directed annular lip 36 which provides further friction and resistance to displacement from the rim flange 15 near the end of the inflating operation, somewhat as indicated in Figs. 3 and 4, and as more fully to be described.

By reason of the nearly complete or at least adequate sealing between the flange 15 and the inner wall of the thick portion 26a (or 27a) not only can air pressure be built up in the cavity of the tire as indicated at 40, but air pressure can also be established in a relatively small annular chamber 42 between the tire bead 22 and the adjacent tire side wall 21 at the lower side, and the flange 15 and lower end of the rubber tool 25 at the upper side.

In using the above-described inflating annulus 25, the tubeless tire 20 is of course first mounted on the rim 12 in a conventional manner, such act being facilitated by the drop-center portion 14 thereof as is well understood. Such assembly is generally laid upon a floor, table or other horizontal support, and the annulus 25 placed thereover and forced into position around the curved rim flange 15. Such mounting is rather easily accomplished by tilting the annulus 25 to one side, the lowered portion of the annulus being pressed upon the adjacent side-wall portion 21 of the tire so as to move the latter down into the broken-line position of Fig. 1 and to move such lower portion of the tool at least partially into the drop center of the rim, whereupon the opposite side of the tool 25 is readily pushed down over the remainder of the rim flange 15, so that in such lowered position of the tool, the upper side wall 21 of the tire will be entirely depressed into the mentioned broken-line position of Fig. 1. The tool 25 is then moved somewhat if necessary in order to center it with respect to the collapsed or depressed upper side wall mentioned. The fitting 18 on the air hose 19 is then applied to the valve stem 17 to introduce air under pressure into the tire cavity 40, the small annular chamber 42 between the upper bead 22 and the upper rim 15 being adequately sealed off by contact of the rubber tool 25 with the rolled edge of the flange 15 and the adjacent upper surface of the side wall 21. If the tire and rim have been laid on a flat support, rather than mounted on a conventional wheel or rim-receiving pedestal, and the lower bead 22 dislodged from the lower flange 15, lifting of the wheel 10 with its rim 14 results in the lower bead 22 dropping into position; or, the assembly may be inverted to assist positioning such bead 22. Continued application of air under pressure through the valve stem 17 causes the upper bead 22 to assume a position somewhat as seen in Fig. 1 or Fig. 2, where the corner of the bead tends to catch or hang up on the adjacent corner of the rim at the junction between the shoulder 16 and the drop center 14. Under normal conditions, and without the present tool installed, such contact is so poor that air pressure is rapidly lost and the upper bead 22 is not forced up into its seat against the flange 15. With this tool such leakage is trapped in the annular chamber 42 above the upper bead 22, by reason of engagement of the lower portion of the tool 25 with the curved flange 15 and with the upper adjacent surface of the side wall 21. Under these circumstances, continued application of air under pressure through the air hose 19 quickly inflates the tire 20 sufficiently to cause the bead 22 to snap up into position such as seen in Fig. 3, the annular tool 25 being correspondingly raised by the increased pressure in the tire. If the lip 36 at the lower inner edge of the tool 25 is employed, this tends to catch under the curved flange 15. If the lip 36 is not used, the thick rubber section 26a within the steel band 30, under compression as indicated, nevertheless adequately retains required air under pressure. As air pressure builds up in the tire sufficient to move the bead 22 into its seat as in Fig. 4, the tool 25 is raised to the position of Fig. 4 and, near the end of the inflation operation, is automatically dislodged so as to be completely freed from the rim by tire expansion.

In the light of the foregoing description of the tool and its operation, it is apparent that the tool 25 produces an adequate sealing at the top of the annular chamber 42 to permit the volume of air under pressure passing through the valve stem 17 to inflate the tire sufficiently to move the upper bead 22 from the positions of Figs. 1, 2 and 3 to the seating position of Fig. 4. Sealing around the flange 15 is effected by compression of the inner thick rubber body 26a within the steel band 30, and sealing against the upper surface of the tire side wall 21 is effected by engagement of the lower edge or outer corner of the tool with the tire side wall, retention of which engagement is assured by the very great "drag" or frictional contact of the inner face of the rubber body 26a against the flange 15 of the rim 14, produced or enhanced by the confined air pressure. Such sealing is facilitated when necessary by provision of the annular ribs 35 which may be deformed to improve the seal as indicated in Figs. 2 and 3.

By employing an inner thick annular portion 26a within the steel band 30 which is considerably thicker than required for a flange 15 of larger diameter, such greater thickness will also accommodate a flange 15 of smaller diameter, it being, of course, necessary to accomplish greater compression of the rubber when installing the tool over a flange 15 of the greatest diameter which can be accommodated.

Certain modifications of the structure of Figs. 1 to 6 are illustrated in Figs. 7 and 8. The structure of Fig. 7 is similar to that of Figs. 1 to 6 but with the difference that one of the steel reinforcing bands is omitted, as a consequence of which the side portion which is not reinforced shrinks to a diameter appreciably smaller than that of the reinforced side. Here, the tool 45 provides a thick rim-engaging portion 46 which is not reinforced and at the opposite side a thick portion 47 which has continuous reinforcing steel band 48 similar to the bands 30 and 31 of the other form, whereby to provide within the band 48 a thick compressible portion 47a. Between the portions 46 and 47 there is an intervening thinner walled annulus 49 formed by shouldering inward from the exteriors of the portions 46 and 47, as indicated at 49a. The annular intermediate portion 49 shrinks on curing like the annular intermediate portion 28 of the form of Figs. 1 to 6. Similarly the non-reinforced rim-engaging portion 46 shrinks inward as illustrated. Both of the edges in this body member 45 may be grooved to provide annular ribs 35 as in the other form, and the lower end preferably is provided with an inwardly projecting annular lip 36 as in the other form. However, the upper end, as seen in Fig. 7, may have the lip 36 omitted. In some instances, as where the rim diameter is accommodated by the unreinforced thick rim-engaging portion 46, this form may be satisfactorily employed, the method of installation and of inflation being the same as that described in connection with Figs. 1 to 6. In this structure the reinforcing steel band 48 in the upper part of the tool stabilizes the tool against expansion at its upper end, if required. This device 45 also may be inverted for rims of appropriate sizes, in which case, with rubber of the indicated Shore hardness, the shrunken annular portion 46 will serve to stabilize the upper end of the tool when thus inverted.

In Fig. 8 there is illustrated a further modification wherein the rubber tool body 50 may be of much softer rubber, such as 30 to 40 Shore hardness, which may be crowded past a flange of a wheel rim with very considerable compression of the rubber to effect sealing contact. In this form the rubber body 50 is surrounded with a wide metal annulus 52 which terminates somewhat within the lower end of the rubber body 50, as indicated at 53, so as to provide an exposed short annular portion 54 adequate for sealing contact with an adjacent side wall portion of the tire when installation is made as in Figs. 1, 2 and 3. If the annular metal wall 52 is of very light gage material, it is desirable to secure to the top edge thereof, as by welding 56, a flat stabilizing ring 55. However, if the reinforcing wall 52 is of sufficiently heavy material offering adequate rigidity, such reinforcing ring 55 could be omitted. In general, the structure of Fig. 8 is appropriate for employing metal of much lighter gage than that of the reinforcing bands 30, 31 and 48.

From the foregoing, it will be apparent that I have provided an inflating tool for tubeless tires which may be readily installed on an automobile wheel rim carrying an uninflated tire, whereby to seal against the outer flange of such a rim and against an adjacent side wall of the tire, so as adequately to limit air leakage when the tire is undergoing inflation as through a valve stem 17, whereby to permit proper inflation of the tire and forcing of the upper tire bead 22, when the parts are in the position of Figs. 1 to 4, into the sealing position of Fig. 4. It is to be appreciated that other appropriate tough, yieldable plastics than rubber may be used for the body member 25, 45 and 50.

I claim as my invention:

1. An inflating device for a tubeless tire mounted on a wheel rim, the device including: a body member of cylindrical shape and having a width to pass around a wheel rim in engagement with the periphery of a flange thereof and having an edge portion to engage an outer side wall of the tire, said body being principally composed of a thick rubber wall yieldable at its inner face to be forced past the rim flange in air retaining contact, said body member including a continuous annular nonextensible band positioned adjacent and spaced radially outward from said inner face, with said edge portion having at least two circumferentially extending, concentric resilient ribs providing an annular contact zone to engage said tire side wall in air retaining contact.

2. An inflating device for a tubeless tire mounted on a wheel rim, the device including: a body member of cylindrical shape and having a width to pass around a wheel rim in engagement with the periphery of a flange thereof and having an edge portion to engage an outer side wall of the tire, said body being principally composed of a thick rubber wall yieldable at its inner face to be forced past the rim flange in air retaining contact, said body member including a continuous annular nonextensible band positioned adjacent said edge portion and spaced radially outward from said inner face, with said edge portion providing an annular contact zone to engage said tire side wall in air retaining contact and an inwardly projecting annular lip for dragging engagement with said rim and flange.

3. An inflating device for a tubeless tire mounted on a wheel rim, the device including: a body member of cylindrical shape and having a width to pass around a wheel rim in engagement with the periphery of a flange thereof and having upper and lower edge portions, said body being principally composed of a thick rubber wall yieldable at its inner face to be forced past the rim flange in air retaining contact, said body member including a continuous annular nonextensible band positioned adjacent each of said edge portions and spaced radially outward from the corresponding inner face, said body member having a central portion between said edge portions of lesser inner and outer diameter than either of said edge portions, with one of said edge portions providing an annular contact zone to engage the tire side wall in air retaining contact.

4. An inflating device for a tubeless tire mounted on a wheel rim, the device including: a body member of cylindrical shape and having a width to pass around a wheel rim in engagement with the periphery of a flange thereof and having an edge portion to engage an outer side wall of the tire, said body member being composed of a molded rubber wall yieldable at its inner face to be forced past the rim flange in air retaining contact, said body member including a continuous annular nonextensible band positioned adjacent said edge portion and spaced radially outward from said inner face to provide a relatively thick compressible wall portion between said rim flange and said band and a relatively thin wall portion between said band and the outer face, with said edge portion having at least two circumferentially extending concentric resilient ribs providing an annular contact zone to engage said tire side wall in air retaining contact and an inwardly projecting annular lip for dragging engagement with said rim and flange.

5. An inflating device for a tubeless tire mounted on a wheel rim, the device including: a body member of cylindrical shape and having a width to pass around a wheel rim in engagement with the periphery of a flange thereof and having an edge portion to engage an outer side wall of the tire, said body member being composed of a molded rubber wall yieldable at its inner face to be forced past the rim flange in air retaining contact, with said edge portion having at least two circumferentially extending concentric resilient ribs providing an annular contact zone to engage said tire side wall in air retaining contact and an inwardly projecting annular lip for dragging engagement with said rim and flange.

References Cited in the file of this patent

UNITED STATES PATENTS

| | | |
|---|---|---|
| 400,600 | Rockwell | Apr. 2, 1889 |
| 2,597,550 | Tritt | May 20, 1952 |
| 2,792,057 | Schreiner | May 14, 1957 |
| 2,874,761 | Varvaro | Feb. 24, 1959 |